(12) United States Patent
Canuti et al.

(10) Patent No.: US 9,897,157 B2
(45) Date of Patent: Feb. 20, 2018

(54) FRICTION MATERIAL

(71) Applicant: ITT Manufacturing Enterprises LLC, Wilmington, DE (US)

(72) Inventors: Anna Maria Canuti, Barge (IT); Paolo Galimberti, Barge (IT); Agustin Sin Xicola, Barge (IT)

(73) Assignee: ITT Italia S.r.l. (IT)

( * ) Notice: Subject to any disclaimer, the term of this patent is extended or adjusted under 35 U.S.C. 154(b) by 70 days.

(21) Appl. No.: 14/708,975

(22) Filed: May 11, 2015

(65) Prior Publication Data

US 2015/0323028 A1 Nov. 12, 2015

(30) Foreign Application Priority Data

May 12, 2014 (IT) .............................. TO2014A0375

(51) Int. Cl.
*F16D 69/00* (2006.01)
*F16D 69/02* (2006.01)
*B22F 1/02* (2006.01)
*B22F 1/00* (2006.01)

(52) U.S. Cl.
CPC .......... *F16D 69/028* (2013.01); *B22F 1/0003* (2013.01); *B22F 1/0059* (2013.01); *B22F 1/025* (2013.01); *F16D 69/026* (2013.01); *B22F 2999/00* (2013.01); *F16D 2200/0069* (2013.01); *F16D 2200/0073* (2013.01); *F16D 2200/0086* (2013.01)

(58) Field of Classification Search
CPC .................................................. F16D 69/026
See application file for complete search history.

(56) References Cited

U.S. PATENT DOCUMENTS

| | | | | |
|---|---|---|---|---|
| 9,039,825 B2* | 5/2015 | Unno | ................... | F16D 69/026 106/36 |
| 2007/0023240 A1* | 2/2007 | Dessouki | ........... | F16D 65/0018 188/73.37 |
| 2009/0064896 A1* | 3/2009 | Pearce | ................. | C10M 103/06 106/36 |
| 2010/0331447 A1* | 12/2010 | Schoo | ................... | F16D 69/025 523/157 |
| 2013/0220748 A1* | 8/2013 | Unno | ................... | F16D 69/026 188/251 A |

(Continued)

FOREIGN PATENT DOCUMENTS

| | | | | |
|---|---|---|---|---|
| EP | 0 151 185 A1 | 8/1985 | | |
| EP | 1 920 168 B1 | 5/2011 | | |
| JP | WO 2011077857 A1 * | 6/2011 | ............ | C01B 33/38 |

OTHER PUBLICATIONS

Machine translation of WO 2011077857 (no date).*

(Continued)

*Primary Examiner* — Nicholas J Lane
(74) *Attorney, Agent, or Firm* — Barclay Damon, LLP

(57) ABSTRACT

A friction material, such as those belonging to the NAO or LS classes. The friction material is substantially free from copper and includes non-spherical particles in the form of powders and/or fibers each constituted by a preferably ferrous metallic core and by an at least partial coating of core formed at least partially or totally by tin and/or tin compounds, such as intermetallic Fe—Sn compounds.

18 Claims, 4 Drawing Sheets

(56) References Cited

U.S. PATENT DOCUMENTS

2014/0202805 A1* 7/2014 Unno .................... F16D 69/026
                                                                   188/251 A
2016/0230827 A1* 8/2016 Kaji ...................... F16D 69/026

OTHER PUBLICATIONS

Powder Processes; Powder Metallurgy for Manufacturing; http://thelibraryofmanufacturing.com/powder_processes.html; date printed: May 11, 2015; 7 pages.
Italian Search Report and Written Opinion for IT TO20140375; dated Jan. 9, 2015; 8 pages.

* cited by examiner

FRICTION MATERIAL

CROSS REFERENCE TO RELATED APPLICATIONS

This application is based upon Italian Patent Application No. TO2014A000375, filed May 12, 2014, under relevant sections of 35 USC § 119, the entire contents of this application being incorporated by reference herein.

TECHNICAL FIELD

The present invention relates to a friction material to be used for the manufacture of friction layers for friction elements such as braking elements, for example brake pads or brake shoes for vehicles, and/or clutch disks that are asbestos free and more general preferably belonging to the friction materials classes known as NAO ("Asbestos-free Organic friction material") and LS ("Low Steel friction material").

In particular, the invention relates to a friction material which allows to reduce the wearing of the friction layer arranged on the friction element (braking element or clutch disk), as well as especially the wearing of the element to be braked, for example, the disc or drum brake of a vehicle, or of the element that in use cooperates with the friction element, defined in technical jargon as a "friction partner", while maintaining good characteristics such as sensitivity with respect to the mating surfaces of the friction partner, which allows to avoid scratches on the mating surface, and adequate braking capacity (friction stability particularly when hot).

TECHNICAL BACKGROUND

The friction materials of the above type include five classes of components: a fibrous material base, a binder and a filler, one or more lubricants or friction modifiers, one or more abrasives. To a great extent asbestos was used in the past as the fibrous material, which material however presents considerable environmental problems and has well known toxic effects on human health and for this reason has been banned by legislation for a long time. This material has therefore been replaced by other materials, both inorganic, such as rock wool, wollastonite and fiberglass and organic materials such as aramid fibers and carbon fibers and metallic such as copper, tin, iron, aluminium and steel powders or fibers and other metals or metal alloys such as bronze and brass. The binder is in general a thermosetting polymer, for example, based on phenolic resins. Various materials are used as a filler such as barite (barium sulfate), calcium carbonate, talc, magnesium oxide, vermiculite; as abrasives, zirconium silicate, zirconium oxide, alumina, silicon carbide, mica; as friction modifiers metal sulfides such as molybdenum disulfide, iron sulfides, copper, tin, graphite and/or coke. Other classes of materials are then added in smaller percentages such as, for example, rubber in powder or granule form, "friction dust", other organic materials.

EP0151185 teaches a material, and a process for its manufacture, constituted by an iron powder coated at least in part with tin, which is intended to produce magnetic cores for electrical apparatuses by means of sintering.

U.S. Pat. No. 8,536,244 relates to a friction material, in particular to a mixture or blend for the production of friction layers, which comprises metallic powders and/or fibers, fillers, lubricants and organic compounds, wherein are present in combination tin, tin alloys or tin compounds (typically oxides) in percentages comprised between 0.5% and 50%, and copper in percentages comprised between 0.001% and about 5%. Furthermore, the surface area of the tin particles or powders must be comprised between 1 and 5 $m^2/g$ and the tin can be as a whole or in part constituted by a surface coating applied over a rounded (spherical shaped) metallic core made of iron. In practice, this document suggests the use in friction material compositions of rounded particles having an iron core and a shell of tin or its alloys in combination with a certain content of copper, possibly being present only in traces.

However, in order to preserve the environment and to avoid possible damage to human health, increasingly more often various national and international regulations require the use of friction materials that are not only free of asbestos and heavy metals but also with a reduced or zero copper content.

The friction material according to U.S. Pat. No. 8,536,244 is furthermore very expensive to produce.

There is therefore a need in the art to provide a friction material that is free of asbestos, heavy metals (such as cadmium or antimony) and copper, having good performance, reduced production costs and that is capable of reducing the wear of the friction elements manufactured with it and especially of the elements ("friction partners") that cooperate with friction elements, particularly when these are made of cast iron or steel.

BRIEF DESCRIPTION

An object of the present invention is to provide a friction material, in particular belonging to the classes of friction materials known as NAO and LS, which is capable of overcoming the drawbacks of the prior art described above and that is not too expensive to produce.

The invention therefore relates to an asbestos-free friction material, in particular belonging to the classes of friction materials known as NAO and LS.

In particular, the friction material according to the invention is formed from a composition or mixture or blend comprising at least one fibrous base including inorganic and/or organic or metal fibers, at least one filler and at least one organic binder, which is substantially free of copper (which may be present at most as an impurity) and which includes non-spherical particles, both in the form of powders and fibers for example, constituted by a metallic, preferably ferrous core, having an asymmetrical, in particular non-spherical shape, and coated at least partially by a layer of tin or tin compounds.

The non-spherical particles constituted by an asymmetrically shaped metallic core which is at least partially coated by a layer of tin or tin compounds according to one aspect of the invention have a granulometry comprised between 0.2 and 600 microns, preferably between 0.2 and 250 microns and a surface area of less than 1 $m^2/g$, in particular comprised between 0.1 and 0.3 $m^2/g$, for a granulometry fraction below 63 microns, oscillating in the near about of 0.2 $m^2/g$.

In addition, the asymmetrically shaped metallic core of each particle and also, as a consequence, of the particles themselves, have a sponge-like conformation; the core is preferably constituted by iron or steel (iron-carbon alloy); the bulk density of the particles is in the near about of 2 $g/cm^3$ and is preferably equal to 2.34 $g/cm^3$.

According to a further aspect of the invention, the non-spherical particles, both in the form of powders and fibers and constituted by an asymmetrically shaped metallic core which is at least partially coated by a layer of tin or tin compounds, include within the layer of tin intermetallic compounds between the tin and the metal that constitutes the core. In particular, the metal core is constituted by iron or steel and tin is present within the partial or total core coating in the form of intermetallic iron-tin compounds of the type $Fe_xSn_y$ (where $1 \leq x \leq 5$, $1 \leq y \leq 3$), for example $FeSn$ and $FeSn_2$.

The above-mentioned non-spherical particles having a metallic, preferably ferrous core, which is partially or totally coated by a layer of tin and/or tin compounds and preferably containing Fe—Sn intermetallic compounds, are present in the composition or mixture or blend of the invention in a percentage by volume comprised between 0.5% and 50%, preferably comprised between 3% and 20%, and the Sn content of the particles is comprised between 20% and 30% by weight of the quantity of particles present.

The composition of the friction material used to form the friction material of the invention may comprise from 0.001% to 10% by volume of solid lubricants, such as, for example, tin sulfides, such as $SnS$ and $SnS_2$.

It is also desirable to include graphite and/or coke in the composition.

The graphite can be any known graphite that is commonly used in friction materials.

The graphite (and/or coke) is added in an appropriately selected amount which is preferably comprised between 2% and 15% by volume of the total friction material composition.

The composition of the friction material used to form the friction material of the invention may include FeMeSn ternary intermetallic compounds (where Me is a metal different from Fe).

Preferably, the friction material of the invention, in addition to being essentially free of copper, includes non-spherical particles in the form of powders and/or fibres each constituted by an asymmetrically shaped ferrous (iron or steel) core and by at least a partial coating of the core which is formed at least partially or totally from Fe—Sn intermetallic compounds.

The invention lastly relates also to a friction element, in particular a brake pad or shoe, presenting a layer of friction material made from the friction material described above.

The invention further relates to a braking system comprising an element to be braked constituted by a disc brake or shoe constituted by cast iron or steel and at least one braking element constituted by a brake pad or shoe which is designed to cooperate by means of friction with the element to be braked, wherein the braking element presents a friction layer which is intended to cooperate with the element to be braked and which is made using the friction material described above.

The other components of the friction material composition of the invention can be components used in friction materials already known in the art.

In particular, the fibrous base can be part of any organic or inorganic fiber which is different than asbestos or else a metallic fiber that is commonly used in friction materials. Exemplary embodiments include inorganic fibers such as fibreglass, rock wool, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile), metallic fibers such as for example, steel fibers, stainless steel, zinc, aluminium fibers, etc.

The fibrous base can be used in the form of either short fibers or powder.

Numerous materials known in the art can be used as organic or inorganic fillers. Illustrative examples include calcium carbonate precipitate, barium sulfate, magnesium oxide, calcium hydroxide, calcium fluoride, slaked lime, talc and mica.

These compounds may be used alone or in combinations of two or more of them. The amount of such fillers is preferably between 2% to 40% by volume based on the total composition of the friction material.

The binder can be any known binder commonly used in friction materials.

Illustrative examples of suitable binders include phenolic resins, melamine resins, epoxy resins; various modified phenolic resins such as epoxy-modified phenolic resins, oil-modified phenolic resins, alkylbenzene-modified phenolic resins and acrylonitrile-butadiene rubber (NSR).

Any one or combinations of two or more of these compounds may be employed. The binder is included in an amount preferably from 2% to 30% by volume based on the total composition of the friction material.

The friction material components according to the invention are generally as follows:
binders
fillers
lubricants/friction modifiers
abrasives
fibres (inorganic/organic/metallic)
metallic powders
non-spherical metallic particles coated with Sn and Sn compounds, preferably Fe—Sn intermetallic compounds.

The friction material of the invention is commonly produced by evenly mixing the specific amounts described above of fibrous base, binder and filler in a suitable mixer such as a Henschel or Loedige Eirich mixer.

The non-spherical ferrous metallic particles of a preferably asymmetrical shape and preferably at least partially coated with a layer of Sn and/or Sn compounds, preferably Fe—Sn intermetallic compounds, used in the invention are commercially available for other purposes and are produced by reacting an Fe powder already having the desired characteristics of granulometry and shape with liquid phase tin, or else they can be produced in accordance with the method described in EP0151185.

It should be noted that, as evidenced for example by http://thelibraryofmanufacturing.com/powder_processes.html, metallic powders naturally present variable and asymmetric shapes which are well known to persons skilled in the art, varying from spherical or simply rounded shape to shapes such as spongy, angular, bowed, cylindrical, acicular or cubic.

In the present invention, non-spherical asymmetrically shaped ferrous metallic particles are preferred both for their reduced surface area and because this shape is more easily obtained, unlike the spherical shape used in U.S. Pat. No. 8,536,244 which is expensive and difficult to obtain.

The brake pad pressing is carried out at a temperature comprised between 60 and 200° C. at a pressure from 150 to 1800 Kg/cm$^2$ for a duration comprised between 3 and 10 minutes or else preforming the mixture within a die and thereafter pressing at a temperature from 130 to 180° C. at a pressure from 150 to 500 kg/cm$^2$ (14.7-49 MPa) for a duration of from 3 to 10 minutes.

The resulting pressed article is typically post-cured by means of heat treatment from 150 to 400° C. for a duration of between 10 minutes to 10 hours, it is then spray painted or powder-painted, kiln-dried and possibly machined where necessary to produce the final product.

The friction material of the invention can be utilized in applications such as disk pad, brake shoes and linings for automobiles, trucks, railroad cars and other various types of vehicles and industrial machines or in clutch disks.

BRIEF DESCRIPTION OF THE DRAWINGS

The present invention will now be described in more detail with reference to the following practical implementation examples and with reference to FIGS. 1 to 4 of the appended drawings, which illustrate.

DETAILED DESCRIPTION

Examples and comparative examples are reported here by way of illustration and are not intended to limit the invention.

Examples

Three formulations were prepared marked with the letters O, A and B, according to the following table.

TABLE 1

| COMPONENTS | TYPE | | |
|---|---|---|---|
| | 0 | B | A |
| Organic fiber | 2.3 | 3.6 | 3.6 |
| Binder | 16.2 | 19.3 | 19.3 |
| Rubber | 2.3 | 2.3 | 2.3 |
| Graphite | 6.5 | 7.6 | 7.6 |
| Fluorine compounds | 3.1 | 3.1 | 3.1 |
| Baryta | 4.4 | | |
| Strong abrasives | 8.4 | 6.7 | 6.7 |
| Sn sulfides | 7.6 | | |
| Metallic sulfides | | 5 | 5 |
| Magnesium oxide | 5.1 | 5.1 | 5.1 |
| Chromite | 4.1 | 4.1 | 4.1 |
| Coke | 20.5 | 20.5 | 20.5 |
| Mild abrasives | 4.5 | 4.5 | 4.5 |
| Vermiculite | 3.2 | 3.2 | 3.2 |
| Steel fiber | 10.9 | 10.9 | 10.9 |
| SN powder | | | 3.2 |
| Metallic powder | 0.9 | 0.9 | 0.9 |
| Non-spherical metallic particles coated with Sn | | 3.2 | |
| Total | 100 | 100 | 100 |

The components shown in Table 1, indicating percentage values by volume of the total volume of the mixture/blend, were evenly mixed in a Loedige mixer and pressed in a die under a pressure of 20 tonnes for 3 minutes at a temperature of 160° C., thereby being cured by means of 10 minutes of heat treatment at 400° C., thus producing a friction material according to the invention indicated under the letter "B", and materials according to the known art, indicted under the letter "O", and a comparative, containing Sn in the form of powders only, indicated under the letter "A".

Brake pads produced as described were subjected to the following tests:

Efficiency tests comprising: running in brakings, brakings at different fluid pressures, "cold" evaluation braking (<50° C.) cold, freeway simulation brakings, two series of high energy brakings (FADE test) interspersed by a series of regenerative brakings.

Wear test comprising various series of brakings with initial braking temperatures (of the brake disk) comprised between 100 and 400° C. and precisely:
1000 brakings with an initial disk temperature of 100° C.
1000 brakings with an initial disk temperature of 150° C.
1000 brakings with an initial disk temperature of 200° C.
1000 brakings with an initial disk temperature of 250° C.
1000 brakings with an initial disk temperature of 300° C.
500 brakings with an initial disk temperature of 350° C.

Figure 4:
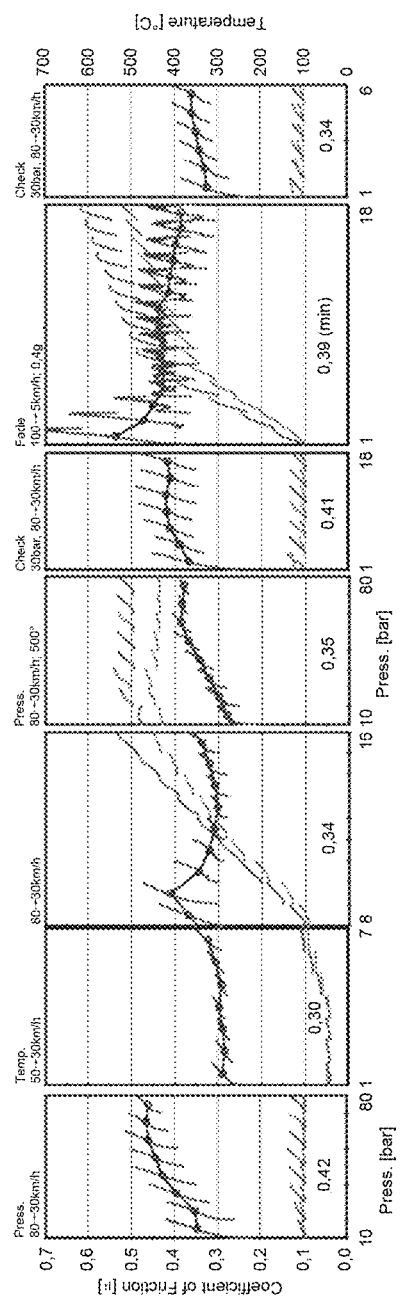
FIGS. 4 and 5 give the results in graphical form of a braking efficiency test.
Figure 5:
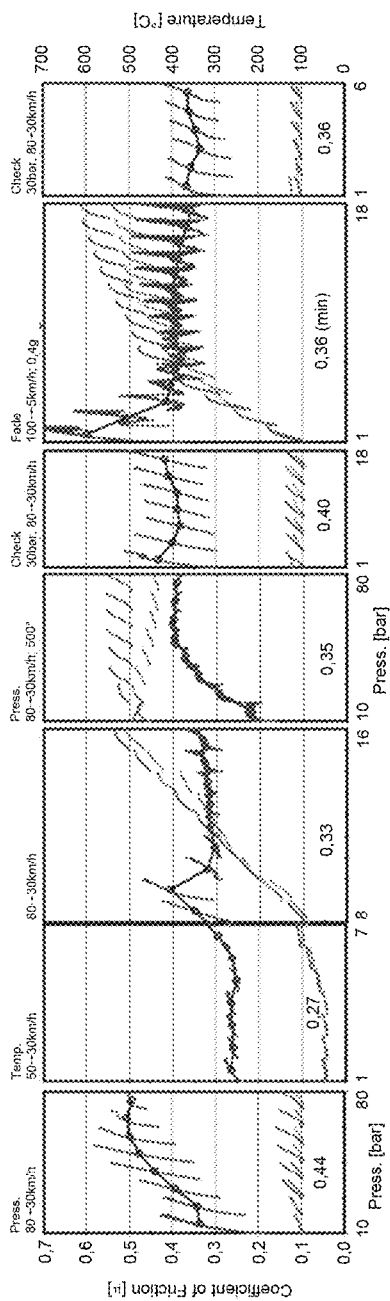

The test results are shown in FIGS. 4 and 5 of the attached drawings and in the following tables. FIG. 4 refers to the comparison mixture/formulation "A" containing free tin within the mixture, while FIG. 5 refers to the mixture/formulation of the invention, containing ferrous particles covered with tin compounds.

TABLE 2

Mix "O" - State of the art
Friction layer wear - pad [mm]

| Brake Temperature (C.) | Inboard Pad Wear per 1000 Stop (mm) | Outboard Pad Wear per 1000 Stop (mm) | Average pads wear per 1000 Stop (mm) |
|---|---|---|---|
| 100 | 0.33 | 0.25 | 0.29 |
| 200 | 0.42 | 0.36 | 0.39 |
| 250 | 0.26 | 0.15 | 0.21 |
| 300 | 0.17 | 0.14 | 0.15 |
| 350 | 0.21 | 0.18 | 0.19 |

Disk Wear [mm]: 0.136
Disk Wear [g]: 41

TABLE 3

Mix "B" - Invention
Friction layer wear - pad [mm]

| Brake Temperature (C.) | Inboard Pad Wear per 1000 Stop (mm) | Outboard Pad Wear per 1000 Stop (mm) | Average pads wear per 1000 Stop (mm) |
|---|---|---|---|
| 100 | 0.27 | 0.23 | 0.25 |
| 200 | 0.40 | 0.32 | 0.36 |
| 250 | 0.14 | 0.14 | 0.14 |
| 300 | 0.17 | 0.12 | 0.14 |
| 350 | 0.10 | 0.10 | 0.10 |

Disk Wear [mm]: 0.078
Disk Wear [g]: 22.9

Comparing the disk wear for both test sets it can be seen that it is lower in the formulation B (the one containing metallic particles covered with Sn).

From the comparison between the formulation O and the formulation B, it can be seen in particular that the disk wear is much improved (it is significantly lower for formula B) from the formula B compared to the formula 0; also there is less pad wear.

From the graphs of FIGS. 4 and 5 it can instead be seen that the braking efficiency of the formulation according to the invention is quite comparable to formulations known in the art but containing tin. Comparison measurements were also made between the formulations A and B with regard to wear, confirming the results of the previous test between the formulations O and B. In particular, the most evident results were obtained regarding the level of disk wear, which is greatly reduced, according to the following comparison:

| Start of Test g | End of Test g |
|---|---|
| Disk wear formulation A - Comparison | |
| 8814.2 | 8807.3 |
| Disk Wear formulation B - Invention | |
| 8799.7 | 8794.9 |

As can be seen the disc wear was less than 30% in the case of the formulation of the invention.

Finally an investigation was made into the nature of the metallic particles containing tin which when added to a formulation of the type substantially known in the art allow surprising results to be obtained as revealed by the tests.

Figure 1:
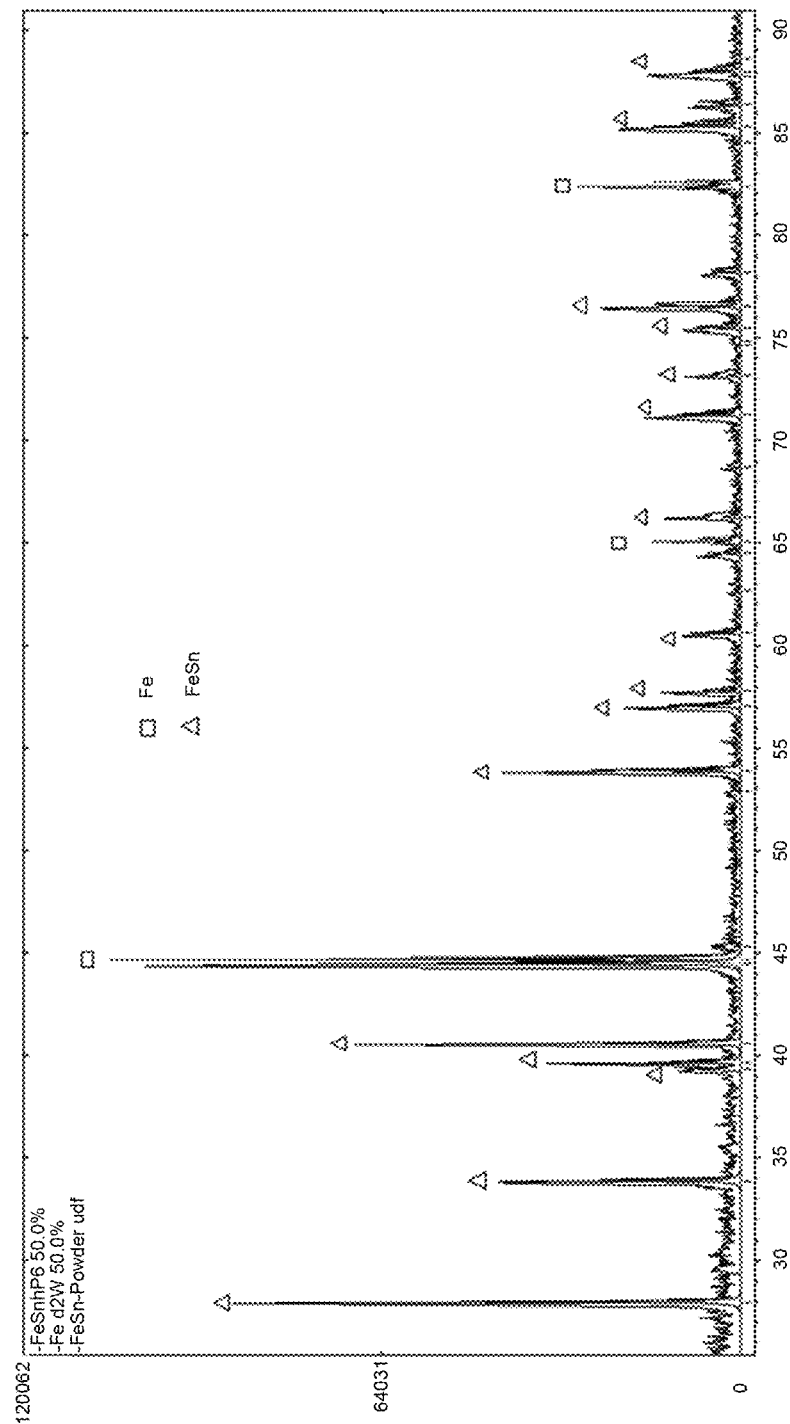
FIGS. 1 and 3 illustrate the results of a diffraction and SEM (Scanning Rlectron Microscope) analysis of the metallic particles coated in tin and its compounds as used according to one version.
Figure 2:
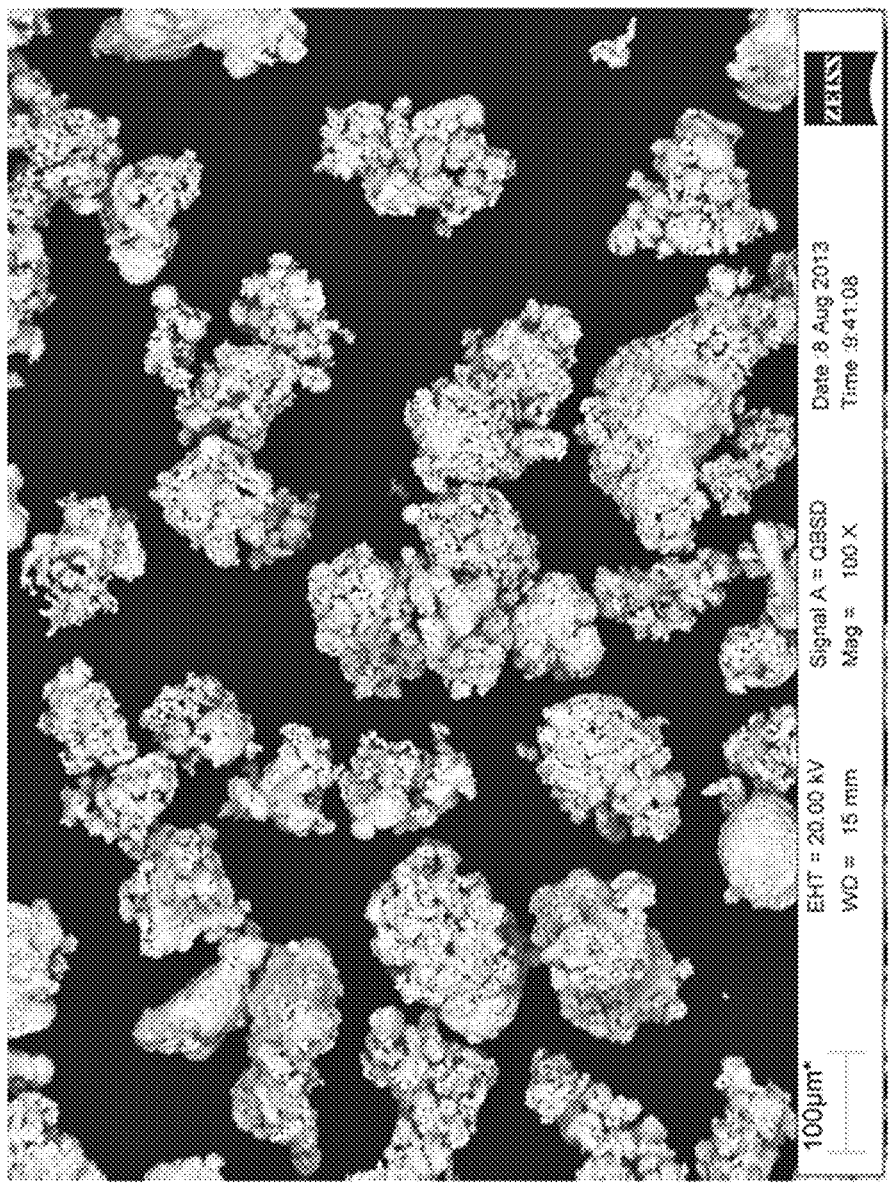
FIG. 2 shows an SEM image of particles used, which highlights their spongy appearance.
Figure 3:
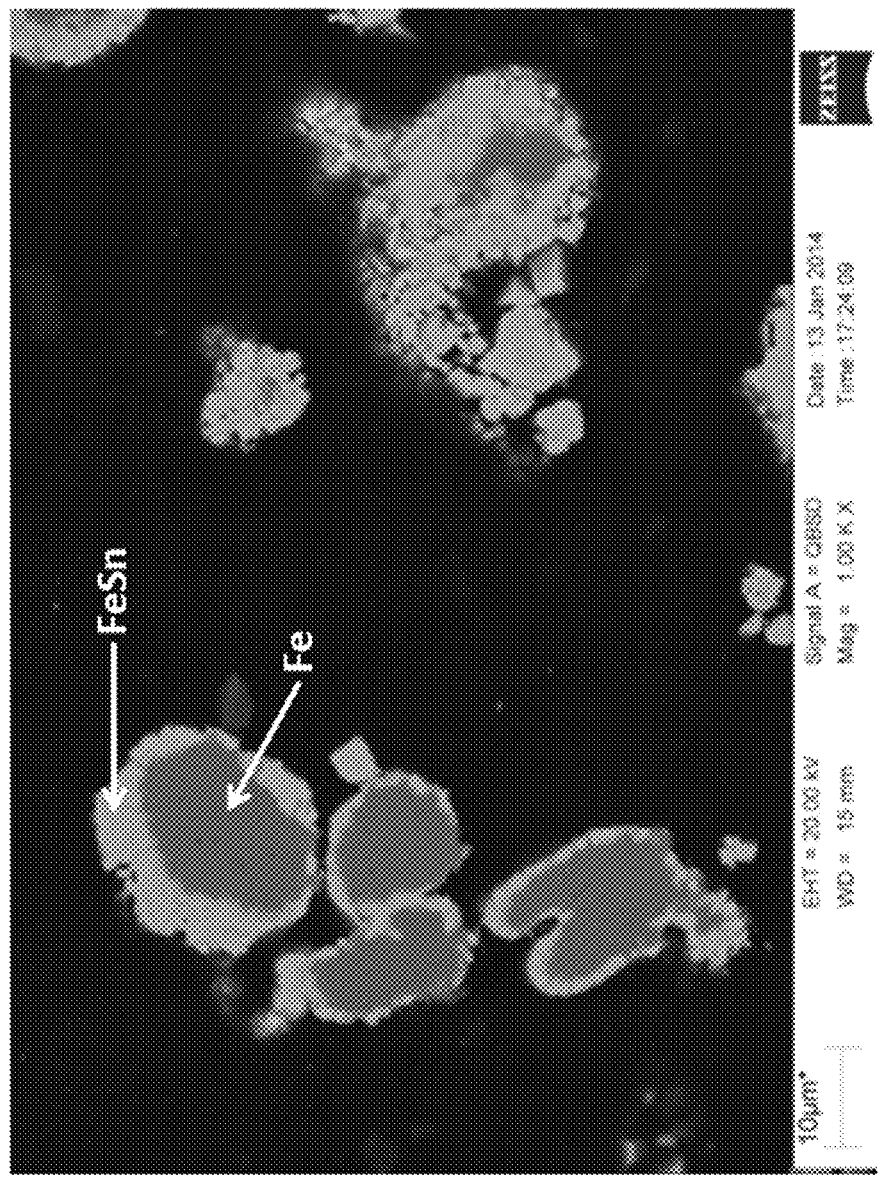

With reference to FIGS. 1, 2 and 3, it became clear that the material used (ferrous particles obtained by mixing with tin, melting and cooling) presents itself in the form of powder particles or fibrous particles having a ferrous core asymmetrically shaped and sponge-like appearance (FIG. 2) which are at least partially coated with a layer of FeSn intermetallic compounds which are clearly identifiable by means of both the diffraction analysis (FIG. 1) and the SEM (FIG. 3—the particles have been cut). The surface area of the particles used, measured using the BET method, resulted surprisingly small (an average of 0.15 m$^2$/g and equal to 0.2087 m$^2$/g for those particles with a granulometry of less than 63 microns).

It is assumed that the beneficial experimental results obtained are due to the fact that the tin present in the form of intermetallic compounds, which are weaker, or at least deposited upon ferrous particles with a reduced surface area, "spreads" (during braking) over the friction partner (disc brake in the tests) better during use than with the formulation containing tin, thus obtaining the resulting significant reduction in disk wear. With respect to traditional tin-free formulations the benefits are even more evident.

The objectives of the invention are then fully achieved.

The invention claimed is:

1. An asbestos-free friction material, comprising at least one fibrous base including inorganic and/or organic and/or metallic fibers, at least one filler and at least one binder, the friction material being substantially free from copper and including non-spherical particles that are constituted by a metallic core of asymmetric shape at least partially coated with a layer of at least one of tine or tin compounds, wherein the coating layer comprises intermetallic compounds of tin and of the metal constituting the core.

2. The friction material according to claim 1, wherein the material belongs to the classes known as NAO or LS.

3. An asbestos-free friction material according to claim 1, further comprising a granulometry comprised between 0.2 and 600 microns.

4. The friction material according to claim 1, wherein the metallic core is made from iron or steel.

5. The friction material according to claim 1, wherein the metallic core is constituted by one of iron or steel and in that tin is present in the partial or total coating layer of the core in form of intermetallic iron-tin compounds of the type Fe$_x$Sn$_y$ (where 1≤x≤5, 1≤y≤3).

6. The friction material according to claim 1, wherein the non-spherical particles have a ferrous metallic core either partially or totally coated by the layer of at least one of tin or tin compounds and are present in the friction material in a percentage by volume comprised between 0.5% and 50%, an Sn content of said particles being comprised between 20% and 30% by weight of the amount of present particles.

7. The friction material according to claim 6, wherein the layer of at least one of tin or tin compounds contains Fe—Sn intermetallic compounds.

8. The friction material according to claim 7, wherein the Fe—Sn intermetallic compounds are present in the friction material in a percentage by volume between 3% and 20%.

9. The friction material according to claim 6, wherein the coating of the ferrous metallic cores forming the non-spherical particles also includes FeMeSn ternary intermetallic compounds, where Me is a metal different from Fe.

10. The friction material according to claim 1, further including:
    lubricants/friction modifiers;
    abrasives; and
    metallic powders.

11. A braking system comprising a member to be braked, constituted by a brake disc or brake drum made of cast iron or steel and at least one braking member constituted by a brake pad or brake shoe, adapted to cooperate by friction with the member to be braked, wherein the braking member has a friction layer intended to cooperate with the member to be braked made of a friction material according to claim 1.

12. A friction element, having a friction layer made with the friction material in accordance with claim 1.

13. The friction material according to claim 1, wherein the material contains Fe—Sn intermetallic compounds in the coating layer.

14. The friction material according to claim 1, wherein the non-spherical particles have a surface area between 0.1 and 0.3 m$^2$/g.

15. The friction material according to claim 1, wherein the at least partial coating of the core is formed totally by Fe—Sn intermetallic compounds.

16. An asbestos-free friction material, comprising at least one fibrous base including at least one of inorganic, organic or metallic fibers, at least one filler and at least one binder, wherein the material is substantially free from copper and includes non-spherical particles each constituted by a ferrous core and at least partial coating of the core formed either at least partially or totally by Fe—Sn intermetallic compounds, and wherein the non-spherical particles have a surface area between 0.1 and 0.3 m$^2$/g.

17. The friction material according to claim 16, in which the material belongs to the classes known as NAO or LS.

18. The friction material according to claim 16, wherein the non-spherical particles are constituted by a ferrous core of asymmetric shape.

* * * * *